US012672992B2

(12) United States Patent
Sielski et al.

(10) Patent No.: US 12,672,992 B2
(45) Date of Patent: Jul. 7, 2026

(54) LIFT FOR CHANGING THE POSITION OF THE SEAT IN A WHEELCHAIR

(71) Applicant: REAC AB, Gothenburg (SE)

(72) Inventors: Zbigniew Sielski, Niedyszyna (PL); Maciej Ciepiela, Raków Duży (PL)

(73) Assignee: REAC AB, Gothenburg (SE)

( * ) Notice: Subject to any disclaimer, the term of this patent is extended or adjusted under 35 U.S.C. 154(b) by 133 days.

(21) Appl. No.: 18/741,473

(22) Filed: Jun. 12, 2024

(65) Prior Publication Data

US 2025/0009577 A1 Jan. 9, 2025

(30) Foreign Application Priority Data

Jul. 5, 2023 (PL) ........................................ 445475

(51) Int. Cl.
*A61G 5/14* (2006.01)
*A61G 5/10* (2006.01)

(52) U.S. Cl.
CPC ............. *A61G 5/14* (2013.01); *A61G 5/1059* (2013.01)

(58) Field of Classification Search
CPC ...... A61G 5/14; A61G 5/1059; A61G 5/1056; A61G 5/1075
USPC ................................................ 297/330, 313
See application file for complete search history.

(56) References Cited

U.S. PATENT DOCUMENTS 5,651,580 A * 7/1997 LaPointe .................. A61G 5/14 297/DIG. 10
6,000,758 A * 12/1999 Schaffner ............. A47C 1/0345 297/DIG. 10
6,659,556 B2 * 12/2003 Pellerin .................... A61G 5/14 297/DIG. 10
8,696,053 B2 * 4/2014 LaPointe .............. A47C 1/0355 297/85 M
8,727,433 B2 * 5/2014 Lawson ............... A47C 1/0355 297/DIG. 10
9,603,453 B2 * 3/2017 Hoffman ............ A47C 1/03211
11,690,453 B2 * 7/2023 Zhang .................... A47C 1/032 297/330
2004/0075237 A1 4/2004 Beck
(Continued)

FOREIGN PATENT DOCUMENTS

DE 19544545 C1 * 1/1997 ............. A61G 15/02
EP 3791847 A1 * 3/2021 ........... A61G 5/1059
(Continued)

OTHER PUBLICATIONS

Polish Report with Written Opinion issued for Priority Application No. P.445475, dated Jul. 28, 2023.

*Primary Examiner* — Jose V Chen
(74) *Attorney, Agent, or Firm* — Myers Wolin, LLC

(57) ABSTRACT

A lift for changing position of the seat in a wheelchair features an upper frame (1) consisting of a horizontal fixed part (2) and a tilting plate (3). The tilting plate (3) is pivotally and slidably mounted with pins (8) in fixed part guides (4). The second support for the tilting plate (3) is provided by tilting arms (5), which are pivotally connected to the tilting plate (3) by means of pins (6), with the tilting arms (5) mounted at their lower end on a pin (7) in the upper frame. The base of the lift consists of a lower frame (9), in which the scissor lifting mechanism arms (10 and 11) of the upper frame are pivotally mounted. The fixed part (2) along with the fixed part guides (4) and the lower frame (9) are made of aluminum profiles.

6 Claims, 2 Drawing Sheets

(56) References Cited

U.S. PATENT DOCUMENTS

| | | | | |
|---|---|---|---|---|
| 2010/0127544 A1* | 5/2010 | Panchbhaya | A61G 5/02 | 297/325 |
| 2012/0062007 A1* | 3/2012 | Telesco | B60N 2/1892 | 297/313 |
| 2016/0096458 A1* | 4/2016 | Parker | B60N 2/10 | 297/313 |
| 2021/0069039 A1* | 3/2021 | Sielski | A61G 5/1056 | |
| 2023/0249586 A1* | 8/2023 | Ploch | B60N 2/22 | 297/330 |

FOREIGN PATENT DOCUMENTS

| | | | | |
|---|---|---|---|---|
| PL | 397089 A1 | 5/2013 | | |
| WO | WO-2013066198 A1 * | 5/2013 | | A61G 5/1075 |

* cited by examiner

LIFT FOR CHANGING THE POSITION OF THE SEAT IN A WHEELCHAIR

CROSS REFERENCE TO RELATED APPLICATIONS

The present patent application is a U.S. national application filed under 35 U.S.C. 111 (a), which claims priority to Polish Application P. 445475, filed on Jul. 5, 2023, the content of which is incorporated in this patent application by reference in its entirety for all purposes.

FIELD OF THE INVENTION

The subject of the invention is the lift for changing position of the seat in a wheelchair intended for use in wheelchairs for people with significant disabilities.

BACKGROUND

A lift from the description P.397089 is known, in which the upper frame consists of a horizontal fixed part and a tilting plate. The tilting plate is pivotally and slidably mounted with pins in fixed part guides. The second support for the tilting plate consists of tilting arms, which are connected to the tilting plate rotatably by means of pins. The tilting arms are mounted at their lower end on a pin in the upper frame. The base of the lift consists of a lower frame, in which the arms of the scissor lifting mechanism for the upper frame are pivotally mounted.

The technical issue lies in the fact that the lift is characterized by a significant mass. This affects the overall weight of the wheelchair significantly. Along with the weight of the wheelchair, difficulties arise in its movement, energy consumption increases, and there's a higher risk of more severe injuries in case of collisions, etc.

SUMMARY

The aim of the invention is to develop a lift with reduced mass while maintaining its mechanical properties.

The essence of the solution is a lift for changing position of the seat in a wheelchair, in which the upper frame consists of a horizontal fixed part and a tilting plate and the tilting plate is pivotally and slidably mounted with pins in the fixed part guides, whereas the second support of the tilting plate are tilting arms, which are connected to the tilting plate pivotally by means of pins, wherein the tilting arms are mounted at their lower end on a pin in the upper frame and the base of the lift is a lower frame, in which the arms of the scissor lifting mechanism of the upper frame are pivotally mounted, in which the fixed part along with the fixed part guides and the lower frame are made of aluminum profiles. The profiles constituting the fixed part with the fixed part guides have two horizontal plates connected by two vertical plates. The horizontal plates are equipped with projections serving as protection for the fixed part guides. The upper frame is mounted in the gaps between the vertical plates, and the upper frame cross member is attached to the sides of the vertical plates.

The profiles of the lower frame have two horizontal plates connected by two vertical plates. The profiles of the lower frame between the vertical plates have mounting sockets, to which the lower frame cross members are attached.

The solution according to the invention allows for a reduction in the lift's mass by approximately 20% without compromising the mechanical properties of the structure.

Additionally, the use of profiles enables a more precise construction of the lift, reducing the resistance during its operation. Replacing welded constructions with profiles also reduces the assembly time of the lift.

BRIEF DESCRIPTION OF THE DRAWING

The subject of the invention is illustrated in the drawing, where.

DETAILED DESCRIPTION OF THE PREFERRED EMBODIMENTS

Figure 1:
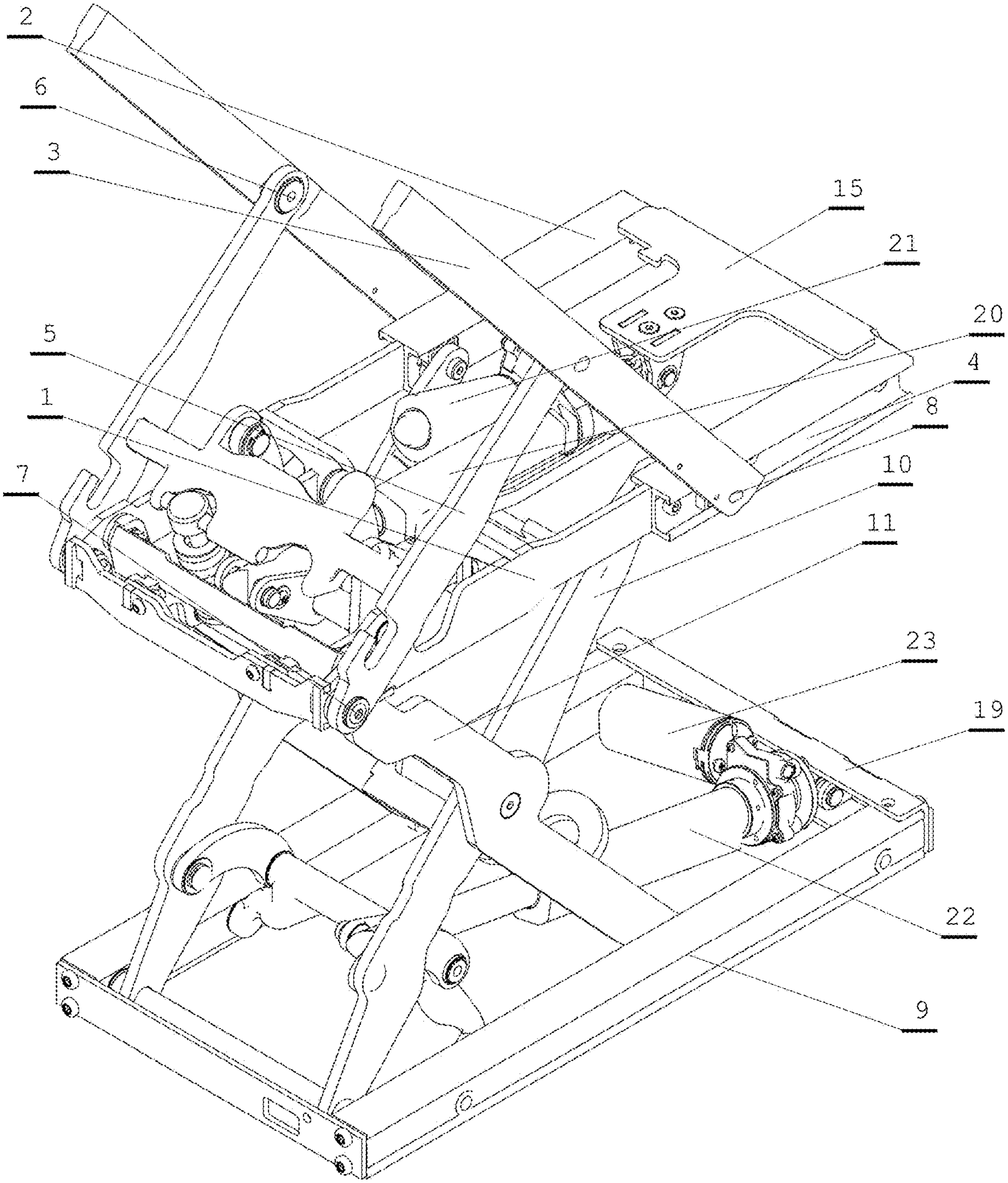
FIG. 1 shows an isometric projection of the lift.
Figure 2:
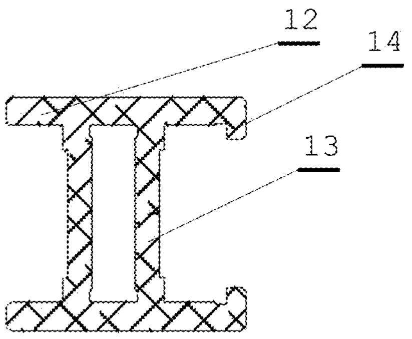
FIG. 2—a cross-section of the profile of the fixed part of the upper frame.
Figure 3:
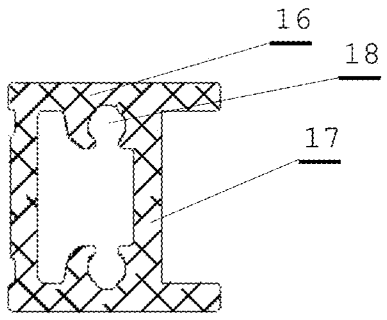
FIG. 3—a cross-section of the profile of the lower frame.
Figure 4:
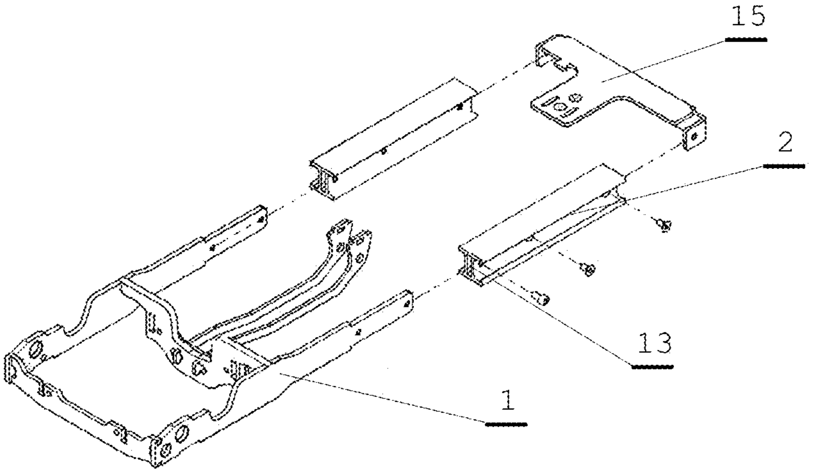
FIG. 4—the upper frame.
Figure 5:
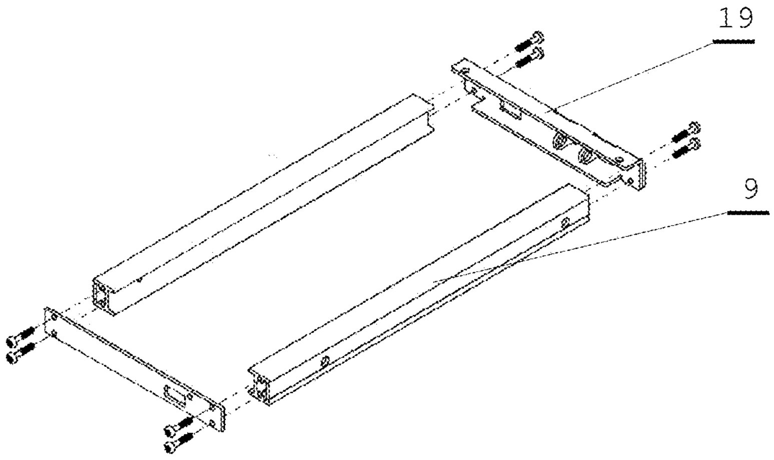
FIG. 5—the lower frame.

Example. Lift for changing position of the seat in a wheelchair features an upper frame 1 consisting of a horizontal fixed part 2 and a tilting plate 3. The tilting plate 3 is pivotally and slidably mounted with pins 8 in fixed part guides 4. The second support for the tilting plate 3 is provided by tilting arms 5, which are pivotally connected to the tilting plate 3 by means of pins 6, with the tilting arms 5 mounted at their lower end on a pin 7 in the upper frame 1. The base of the lift consists of a lower frame 9, in which the scissor lifting mechanism arms 10 and 11 of the upper frame are pivotally mounted. The fixed part 2 along with the fixed part guides 4 and the lower frame 9 are made of aluminum profiles. The profiles constituting the fixed part 2 with the fixed part guides 4 have two horizontal plates 12 connected by two vertical plates 13. The horizontal plates are equipped with projections 14 serving as protection for the fixed part guides 4. The upper frame 1 is mounted in the gaps between the vertical plates 13, and the upper frame cross member 15 is attached to the sides of the vertical plates 13. The profiles of the lower frame 9 feature two horizontal plates 16 connected by two vertical plates 17. The profiles of the lower frame 9, between the vertical plates 17, have mounting sockets 18, to which the lower frame cross members 19 are attached. The movement of the tilting plate 3 is achieved by an actuator 20 driven by a motor 21 arranged parallel to the actuator 20, and the lifting of the upper frame 1 is achieved by an actuator 22 driven by a motor 23 arranged perpendicular to the actuator 22.

The invention claimed is:

1. A lift for changing position of a seat in a wheelchair, the lift comprising:

an upper frame which comprises:

a horizontal fixed part, a tilting plate, the tilting plate is pivotally and slidably mounted with pins in guides, the guides fixed to the horizontal fixed part, and tilting arms, an upper part of the tilting arms are connected to the tilting plate pivotally by means of pins, and the tilting arms are pivotally mounted at their lower end on a pin in the upper frame;

a scissor lifting mechanism; and a base of the lift which is a lower frame, in which upper arms of the scissor lifting mechanism are pivotally mounted to the upper frame and lower arms of the scissor lifting mechanism are pivotally mounted to the lower frame, and wherein the horizontal fixed part along with the guides and the lower frame are made of aluminium profiles; wherein the aluminium profiles constituting the horizontal fixed part with the guides have two horizontal plates connected by two vertical plates.

2. The lift according to claim 1, wherein the two horizontal plates are equipped with projections serving as protection for the guides.

3. The lift according to claim 2, wherein the aluminium profiles of the lower frame have two horizontal plates connected by two vertical plates, and the lower frame, between the two vertical plates, have mounting sockets, to which lower frame cross members are attached.

4. The lift according to claim 1, wherein the upper frame is mounted in gaps between the vertical plates, and an upper frame cross member is attached to sides of the two vertical plates.

5. A lift for changing position of a seat in a wheelchair, the lift comprising:

an upper frame which comprises:

a horizontal fixed part, a tilting plate, the tilting plate is pivotally and slidably mounted with pins in guides, the guides fixed to the horizontal fixed part, and tilting arms, an upper part of the tilting arms are connected to the tilting plate pivotally by means of pins, and the tilting arms are pivotally mounted at their lower end on a pin in the upper frame;

a scissor lifting mechanism; and a base of the lift which is a lower frame, in which upper arms of the scissor lifting mechanism are pivotally mounted to the upper frame and lower arms of the scissor lifting mechanism are pivotally mounted to the lower frame, and wherein the horizontal fixed part along with the guides and the lower frame are made of aluminium profiles; and wherein the aluminium profiles of the lower frame have two horizontal plates connected by two vertical plates.

6. The lift according to claim 5, wherein the aluminium profiles of the lower frame, between the two vertical plates, have mounting sockets, to which lower frame cross members are attached.

* * * * *